Patented Apr. 20, 1937

2,077,841

UNITED STATES PATENT OFFICE 2,077,841

CONDENSATION PRODUCTS AND PROCESS OF MAKING SAME

Wilhelm Kraus, Vienna, Austria

No Drawing. Application November 23, 1933, Serial No. 699,463. In Germany February 10, 1932

13 Claims. (Cl. 260—3)

This invention relates to the manufacture of condensation products from urea, formaldehyde and hexamethylenetetramine or compounds acting similarly to hexamethylenetetramine. It comprises the process of the manufacture of said compounds as well as the new products themselves and their application in the industry of plastic masses.

It has already been proposed to condense urea in the presence of ammonia or hexamethylenetetramine. The products obtained by this method harden badly and slowly, and are sensitive to the action of water. Moreover, these products are deficient in mechanical strength.

The invention is characterized by the novel feature that the condensation between the components urea, formaldehyde and hexamethylenetetramine, is conducted in the presence of added acid catalysts.

The acid catalysts, according to the present invention, are advantageously added in the form of an aqueous acid solution of formaldehyde having a pH lower than 3.

The ratio of hexamethylenetetramine to urea is preferably such that for each molecule of hexamethylenetetramine approximately 14 molecules of urea are used. As shown in the examples, hereinafter set forth, up to about 62 molecules of urea may be used for each molecule of hexamethylenetetramine. The preferred proportion lies between approximately 14 and approximately 30 molecules of urea for each molecule of hexamethylenetetramine.

The proportion of hexamethylenetetramine should, in any case, be larger than is necessary for the formation of a salt with the acid present.

The ratio between urea and formaldehyde is such that one molecule or more of formaldehyde is used for each molecule of urea. More than two molecules of formaldehyde are not employed.

The temperature conditions are preferably such that heating takes place only while the reaction mixture is alkaline or neutral. As soon as the reaction mixture shows acid reaction heating is preferably avoided.

Instead of hexamethylenetetramine itself, it is also possible to employ suitable quantities of ammonia and formaldehyde, in which case hexamethylenetetramine is formed in the reaction solution. It is also possible to employ, in the same manner as hexamethylenetetramine, nitrogenformaldehyde compounds of a similar nature, which likewise possess free residual valencies, either in place of hexamethylenetetramine or in addition thereto. Examples of compounds of this nature are the formaldehyde compounds of hydrazine or of its derivatives, and the mono- and dialkyl compounds of ammonia. Accordingly, the term "hexamethylenetetramine" is meant to include not only this specific substance, but also the corresponding condensation products produced by the action on formaldehyde of mono- or dialkylamines or hydrazine.

In view of the fact that hexamethylenetetramine is of alkaline reaction, care must be taken that it does not check the desired acid course of the reaction.

Within the above-defined scope of the invention, the following variations of procedure may be made:

1. All the reaction components, as well as the acid catalyst, may from the start be brought together in the ratio provided for according to the invention. Due to the fact that more hexamethylenetetramine is present than is required for the formation of a hexamethylenetetramine salt of the acid employed as catalyst, alkaline reaction sets in. The alkaline reaction is changed to acid reaction by heating. As soon as the reaction has become acid, the mass must be allowed to cool. The further steps of the process are thus performed advantageously without the application of heat. The lower the temperature of conversion, the better are the results.

2. Only a portion of the urea and of the formaldehyde are first condensed, in the heat, with the total quantity of hexamethylenetetramine in the presence of the acid catalyst. In this case there are obtained, as intermediate products, masses of acid reaction which are not capable of being hardened and which are therefore not suitable for molding. The heat treatment of these masses can thus be carried out without any particular precaution. After cooling there are added to the acidly reacting mass the remaining quantities of urea and formaldehyde after which condensation is resumed, without the application of heat, until moldable products are obtained.

3. Only a portion of the urea and of the formaldehyde are first condensed in the heat with the total quantity of hexamethylenetetramine in the presence of acid catalysts as indicated under 2. The resultant water soluble, fusible and non-hardenable intermediate product is then freed from water. The remaining quantity of urea and formaldehyde is separately condensed and dehydrated in the absence of acid catalysts, to produce a soluble and fusible product, whereupon both products are cooled, mixed together and then subjected to a preliminary polymerization by heat. They are transformed by this treatment into products which harden quickly.

4. The condensation is initiated at a pH value of the aqueous acid formaldehyde solution lower than 3 while cooling (to about 20° C.) with so little hexamethylenetetramine that the reaction remains acid. Condensation is then continued, while cooling, until masses are produced which are still capable of forming drops or which are thickly creamy or thickly pasty. In no case should the condensation be continued until chalky and easily crumbled or hard masses are obtained. To the thick creamy or pasty masses there are added further quantities of hexamethylenetetramine, the addition being so regulated that either the acid reaction is maintained or that alkaline reaction is set up. According to either of these methods of working, the hexamethylenetetramine can be added either in one portion or in a number of smaller portions. In order to convert any masses of alkaline reaction which may be present into masses of acid reaction, the alkaline masses may be mixed with masses of acid reaction. The resultant masses are then left to mature without the application of heat, unctuous masses being thereby often obtained.

5. Urea and formaldehyde are condensed, in absence of hexamethylenetetramine, at a pH value of the aqueous formaldehyde solution lower than three, while cooling, up to the point at which masses are produced which are still capable of forming drops or which are thickly creamy or thickly pasty, the condensation being stopped before the point at which chalky, easily crumbled masses are formed, after which hexamethylenetetramine is added, the further treatment being the same as described under 4.

It is evident that besides these variants many more may be devised without departing from the scope of the invention.

Those methods of condensation in which the total quantity of hexamethylenetetramine is used from the outset can also be carried out in the melt.

As acid catalysts there can be utilized inorganic and organic acids, compounds yielding acids by cleavage, and salts of acid reaction, either separately or in commixture. The addition of these catalysts can be effected either at once or in portions. It is always advisable to dissolve the acid catalyst in formaldehyde before the other initial substances are added. As examples of acid catalysts there may be mentioned sulfuric acid, phosphoric acid, acetic acid, oxalic acid, citric acid, potassium bitartrate, and so on.

It is possible to employ, apart from urea, formaldehyde, and hexamethylenetetramine, further compounds which react with formaldehyde. The compounds of this nature here concerned are: urethane, formamide, acetamide, oxamide, thiourea, phenol, and the like.

The condensation products may, if desired, be totally or partially neutralized or rendered alkaline in any stage of their being further worked up.

The condensation products obtained by the various methods indicated can if desired be mixed with fibrous and other filling material and coloring matter, and is then dried and comminuted. The condensates produced in accordance with the present invention are distinguishable from the known condensates produced from urea alone in the presence of acid catalysts by the fact that they can easily be dried without the necessity for precautionary measures, and without any danger of impairing their moldability and ability to flow readily. It is even perfectly possible to eliminate a large proportion of the water from the condensation products manufactured in accordance with the invention, by vacuum distillation, before commixture with filling materials, in spite of the presence of acid reaction. The drying is preferably carried out at temperatures below 100° C., either in vacuo or by a current of hot air, or in any other known manner. The conversion into the final state is effected either in the heat or under heat and pressure. The pressure used is of the order of 100 to 150 kg./cm.$^2$ and the pressing temperature can vary between 130 and 160° C. The hardening takes place in rapid molding times. The products are non-sensitive within wide limits to the influence of temperature. The molded articles made from these products are extremely hard when they leave the hot mold, and are absolutely resistant to water.

The hardening process may also take place in casting molds.

The following examples illustrate the invention without however limiting its scope, the parts being by weight:—

*Example 1*

180 parts of urea, 14 parts of hexamethylenetetramine, and 364 parts of 40 vol. % formaldehyde containing 1.5 to 2 parts of citric acid in solution, are heated to boiling, and then further heated for some minutes under reflux. The alkaline reaction at first present after the mixing of the initial substances passes over rapidly, on heating, to a strongly acid reaction. The clear and thinly liquid condensation solution is mixed with fibrous and filling materials, dried in vacuo or in a current of air at a temperature below 70° C. and then comminuted. In spite of the acid content, a compressible powder is obtained which has excellent flowing properties, which hardens very rapidly in the hot press, and which is but very slightly sensitive to the influence of temperature. The molded articles are highly resistant to the action of water.

With the retention of the same course of reaction, the same result is obtained when starting with 180 parts of urea, 28 parts of hexamethylenetetramine, 364 parts of 40 vol. % of formaldehyde containing 3 to 4 parts of citric acid.

If the condensations specified above be carried out without hexamethylenetetramine, but with otherwise the same initial products and substances in the same proportions, there results within a few seconds after the attainment of the boiling temperature, on account of the acid added, a firm hard cake which no longer admits of mixture with filling material or of being molded, and which is thus technically worthless.

*Example 2*

120 parts of urea, 173 parts of a 40 wt. % formaldehyde solution, 8 to 16 parts of a 40% monomethylamine solution, 5–20 parts by volume of a 10% acetic acid solution, are boiled for ¼ to ¾ hour under reflux, mixed with cellulose and 0,5 part of citric acid, dried and comminuted.

*Example 3*

120 parts of urea, 244 parts of 40 vol. % formaldehyde, 9.3 parts of hexamethylenetetramine, 0,5 part of oxalic acid are heated to 50° C. for 8½ to 9 hours, until acid reaction has set in and hydrophobe products separate. The mass is cooled down to room temperature, whereupon the quantity of separated resin still increases. The mass is then left to stand for some days at room temperature. It is then mixed with filling materials, and dried and comminuted at room temperature.

*Example 4*

120 parts of urea, 244 parts of 40 vol. % formaldehyde, 9.3 parts of hexamethylenetetramine, and 1 part of oxalic acid are heated to 70° C. until acid reaction occurs. Hydrophobe resinous masses are separated in the heat. The mixture is then cooled down to room temperature, and further treated as given in Example 3, whereupon the quantity of separated resin still increases.

*Example 5*

90 parts of urea, 38 parts of thiourea, 244 parts of 40 vol. % formaldehyde, 9.3 parts of hexamethylenetetramine, and 0.5 part of oxalic acid are heated to 60° C. for about 3½ hours. The solution which is finally of strong acid reaction is cooled down to room temperature, and further treated as specified in Example 3.

*Example 6*

60 parts of urea, 38 parts of thiourea, 4 to 8 parts of hydrazine-hydrate, 183 parts of 40 vol. % formaldehyde, and 0.5 part to 1 part of citric acid are heated to about 55 to 60° C. for a quarter to three-quarters of an hour, mixed with fibrous material, left to stand for 24 hours, and further treated in the manner specified in connection with Example 3. The hydrazine-hydrate is added to the reaction mixture only after at least partial dissolving of the urea or of the urea and thiourea in formaldehyde.

*Example 7*

79.5 parts of urea, 150 parts of 40 wt. % formaldehyde, 37.2 parts of hexamethylenetetramine, and 2 parts of oxalic acid are heated to boiling, kept boiling for a few minutes, until acid reaction is attained. The solution is then cooled down to room temperature, and there are added thereto 750 parts of 40 wt. % formaldehyde, 340 parts of urea, and 76 parts of finely comminuted thiourea, and left to stand for some days, with initial agitation, and without the application of heat. The further working up is effected as in Example 3.

*Example 8*

A mixture of 480 parts of urea, 37.2 parts of hexamethylenetetramine, 989 parts of 40 vol. % formaldehyde wherein 6 parts of oxalic acid are dissolved, is heated to from 65 to 70° C. until the first portions of hydrophobe resin separate, which is as a rule the case after about three quarters of an hour or so. The mass is allowed to stand for some days which causes separation of further large quantities of resins. The mixture thus obtained is incorporated with filling or fibrous materials then brought to from 60 to 70° C., during about ½ or ¾ of an hour, neutralized with about 2.8 parts of magnesium hydroxide and finally dried and molded.

*Example 9*

A mixture of 30 parts of urea, 14 parts of hexamethylenetetramine, 60 parts of 40 vol. % formaldehyde wherein 0.5 part of oxalic acid are dissolved, are heated to 70° C. during 1 to 2 hours while continuously stirring and using a surface as large as possible. There is formed a gelatinized, glass-clear product poor in water which is finely disintegrated. The product is soluble in hot water (intermediate product A). 150 parts of urea and 303 parts of neutralized 40 vol. % formaldehyde are evaporated at normal pressure until the reaction mixture has reached a boiling point of 120° C. The residue is a white opaque easily fusible product, which is thinly viscous in the heat and of good plasticity in the cold, and which dissolves in hot water (intermediate product B). A and B are homogeneously mixed with addition of cellulose and other filling materials and worked on the heated roll until the resin mixture which in the beginning is very fluid has attained the degree of flux adapted for molding purposes.

*Example 10*

A mixture of 30 parts of urea, 14 parts of hexamethylenetetramine, 60 parts of 40 vol. % formaldehyde containing in solution 1 part of oxalic acid is distilled under a diminished pressure (from 30 to 50 mm.) and at external heating temperatures of from 60 to 90° C. There are passing over 40 parts by volume of liquor. The resin remaining in the residue is very fluid in the heat and very plastic and glass-clear (intermediate product A).

A solution of 150 parts of urea in 303 parts of neutral 40 vol. % formaldehyde is distilled in vacuo in the same manner as intermediate product A. There are passing over 185 parts by volume of liquid. The resin thus freed from water is somewhat turbid, readily fusible in the heat and of good plasticity in the cold (intermediate product B). The resins A and B are mixed with each other and with cellulose in heated calenders as indicated in Example 9.

*Example 11*

The solution of 120 parts of urea, 1 part of hexamethylenetetramine, and 1 part of oxalic acid in 244 parts of 40 vol. % formaldehyde is left to stand for 8 hours under cooling. Care is taken that the temperature does not rise above 6° C. There results a milky mass still capable of forming drops, into which there are introduced, while stirring, 9.3 parts of hexamethylenetetramine dissolved in a small quantity of water, the mass being caused by this addition to acquire alkaline reaction. The mass is then left to stand for some time, say 24 hours, without the application of heat, after which it is mixed with filling materials, dried, and comminuted. If the initial condensation mass be left to stand for longer than 8 hours it absorbs the specified quantity of hexamethylenetetramine and even larger quantities with the retention of acid reaction.

The ability of the initial condensation mass subsequently to absorb still further quantities of hexamethylenetetramine depends upon the momentary condition of the mass. The above-mentioned milky and still fluid condensation mass can also be obtained in a shorter time than 8 hours if the process be carried out at a higher value of the pH or at a somewhat higher temperature. Conversely, the time required for condensation is extended if the condensation be carried out at a lower pH or at a lower temperature.

*Example 12*

The solution of 120 parts of urea, 1 part of hexamethylenetetramine, and 1.5 parts of oxalic acid in 244 parts of 40 vol. % formaldehyde is left to stand for 15 hours, the temperature being not allowed to rise above 6° C. during this time. There results a thickly pasty mass which absorbs 18.6 parts of hexamethylenetetramine with retention of acid reaction. The further treatment is as in Example 8.

Example 13

The solution of 120 parts of urea, 1 part of hexamethylenetetramine, and 1 part of oxalic acid in 244 parts of 40 vol. % formaldehyde is left to stand for 8 hours under cooling. The pasty mass thus obtained receives the addition of 9.3 parts of hexamethylenetetramine, whereupon the reaction becomes alkaline. This alkaline solution, after commixture with cellulose and evaporation in vacuo, is brought together with an acid condensation mass obtained from 120 parts of urea, 1 part of hexamethylenetetramine, and 1 part of oxalic acid in 244 parts of formaldehyde by eight hours' standing under cooling. On intermixture, the alkaline reaction passes over into an acid reaction.

Example 14

The solution of 108 parts of urea, 18.8 parts of phenol, 1 part of hexamethylenetetramine, and 1 part of oxalic acid in 244 parts by weight of 40 vol. % formaldehyde is left to stand for 8 hours under cooling. Into the thickly creamy mass there are introduced 7 parts of hexamethylenetetramine. The reaction remains acid. The mass thus obtained is left to stand for some time, say 24 hours, without the application of heat, after which it is mixed with filling materials, dried, and comminuted.

Example 15

The solution of 108 parts of urea, 17.6 parts of urethane, 1 part of hexamethylenetetramine, and 1 part of oxalic acid in 244 parts of 40 vol. % formaldehyde is left to stand for 10 hours under cooling, a thickly pasty mass being thereby obtained. Into this mass there are introduced 8 parts of hexamethylenetetramine. The acid reaction is maintained. The further treatment is effected in accordance with Example 8.

Example 16

The solution of 120 parts of urea and 0.5 part of oxalic acid in 244 parts of 40 vol. % formaldehyde is left to stand for 4 hours under cooling, after which time it has acquired thickly creamy consistency. Into this mass there are introduced 4.5 parts of hexamethylenetetramine. The reaction remains acid. The mass is further left to stand some 24 hours without the application of heat, until it has acquired unctuous consistency, after which it is mixed with filling materials, dried, and comminuted.

If 9.3 parts of hexamethylenetetramine be added in place of the subsequently added 4.5 parts, there are obtained masses of alkaline reaction which yield, like the acid masses, rapidly compressible powders. If the duration of the action of the acid formaldehyde upon the urea be prolonged, and cooling be at the same time effected, the above-mentioned 9.3 parts of hexamethylenetetramine and even larger quantities of hexamethylenetetramine are absorbed with retention of acid reaction.

Example 17

The solution of 120 parts of urea and 0.5 part of oxalic acid in 244 parts of 40 vol. % formaldehyde is left to stand for 4 hours under cooling, until thickly creamy consistency is attained. There are then added 9.3 parts of hexamethylenetetramine, alkaline reaction being thereby obtained. To the mass of alkaline reaction there are linked 150 parts of a mass of acid reaction produced from 120 parts of urea, 0.5 part of oxalic acid, and 244 parts of formaldehyde, by being left to stand for 4 hours, and by the subsequent addition of 4.5 parts of hexamethylenetetramine. The mass is thereby converted to acid reaction.

Example 18

The solution of 108 parts of urea, 11.8 parts of acetamide, and 0.5 part of oxalic acid in 244 parts of 40 vol. % formaldehyde is left to stand for 5 hours. Into the thickly creamy mass thus obtained there are introduced 8 parts of hexamethylenetetramine, the acid reaction being thereby retained. Instead of acetamide, corresponding quantities of formamide or of oxamide can be introduced.

The mechanical, physical, and chemical properties of the molded articles, obtained according to any varient of the present process, are excellent.

What I claim is:—

1. The method of manufacturing condensation products from urea, formaldehyde and hexamethylenetetramine which comprises admixing the urea and hexamethylenetetramine in a proportion such that approximately 14 to approximately 62 mols of urea are present for each mol. of hexamethylenetetramine used, in an aqueous acid solution of formaldehyde having a pH lower than 3 and containing between approximately 1 mol. to approximately 2 mols of formaldehyde per mol. of urea used, the proportion of acid present being less than that required for converting all the hexamethylenetetramine into the corresponding salt, and heating the condensation mixture until acid reaction is attained.

2. The method of manufacturing condensation products from urea, formaldehyde and hexamethylenetetramine which comprises admixing the urea and hexamethylenetetramine in a proportion such that there are about 14–30 mols of urea present per mol. of hexamethylenetetramine used, in an aqueous acid solution of formaldehyde having a pH lower than 3 and containing between approximately 1 mol. to approximately 2 mols of formaldehyde per mol. of urea used, the proportion of acid present being less than that required for converting all the hexamethylenetetramine into the corresponding salt, and heating the condensation mixture until acid reaction is attained.

3. The method according to claim 1, and, after attainment of acid reaction, cooling the mixture to room temperature and completing the process without the application of heat.

4. The method of manufacturing condensation products from urea, formaldehyde and hexamethylenetetramine, the proportions of said components used being such that the ratio urea:formaldehyde ranges from approximately 1:1 to 1:2 and the ratio urea:hexamethylenetetramine ranges from approximately 14:1 to approximately 62:1, said process comprising first heating such small portions of the urea and formaldehyde with the total quantity of hexamethylenetetramine in an aqueous acid solution of the formaldehyde having a pH lower than 3 that condensation products of acid reaction are obtained which are not directly suitable for molding, then cooling the mixture, adding the remaining quantities of urea and formaldehyde, and completing the condensation without application of heat, whereby hardenable products are obtained.

5. The method of manufacturing condensation products from urea, formaldehyde and hexamethylenetetramine, the proportions of said components used being such that the ratio urea:formaldehyde ranges from approximately 1:1 to 1:2 and the ratio urea:hexamethylenetetramine ranges from approximately 14:1 to approximately 62:1, said process comprising condensing a part of the total quantity of the urea and formaldehyde with the total quantity of the hexamethylenetetramine in an aqueous acid solution of the formaldehyde having a pH lower than 3, whereby a water soluble fusible and non-hardenable product is obtained, eliminating water from said product, then separately condensing and dehydrating the remainder of the urea and formaldehyde in absence of acid, whereby a second soluble and fusible product is obtained, then cooling and admixing said products, and finally converting the admixture into a hardenable product by the application of heat.

6. The method of manufacturing condensation products from urea, formaldehyde and hexamethylenetetramine, the proportions of said components used being such that the ratio urea:formaldehyde ranges from approximately 1:1 to 1:2 and the ratio urea:hexamethylenetetramine ranges from approximately 14:1 to approximately 62:1, said process comprising condensing the urea and the formaldehyde, while cooling in an aqueous acid solution of the latter having a pH lower than 3 in the presence of such a small portion of the hexamethylenetetramine that the reaction remains acid, until a creamy, pasty mass results, the condensation being interrupted before reaching the point at which a chalky, easily crumbled mass is formed, then adding additional hexamethylenetetramine, and subjecting the resultant product to a maturing process without the application of heat.

7. The method of manufacture according to claim 6, wherein the condensation previous to adding the additional hexamethylenetetramine is carried to the point at which masses are produced which are still capable of forming drops.

8. The method of manufacturing condensation products from urea, formaldehyde and hexamethylenetetramine, the proportions of said components used being such that the ratio urea:formaldehyde ranges from approximately 1:1 to 1:2 and the ratio urea:hexamethylenetetramine ranges from approximately 14:1 to approximately 62:1, said process comprising condensing the urea and the formaldehyde, while cooling, in an aqueous acid solution of the latter having a pH lower than 3, until a creamy, pasty mass results, the condensation being interrupted before reaching the point at which a chalky, easily crumbled mass is formed, then adding the hexamethylenetetramine and subjecting the resultant product to a maturing process without the application of heat.

9. The method of manufacture according to claim 8, wherein the condensation previous to adding the hexamethylenetetramine is carried to the point at which masses are produced which are still capable of forming drops.

10. A method of manufacture according to claim 1, in which instead of urea alone a mixture of urea with less than equivalent proportions of other compounds which react with formaldehyde to form condensation products and selected from the group thiourea, phenols, urethane, acetamide, formamide and oxamide, is employed.

11. A moldable acid-catalyzed condensation product containing the constituents of urea, formaldehyde and hexamethylenetetramine in chemical combination, the radical of hexamethylenetetramine being present in the condensation molecule in undecomposed state, said product being obtained by condensing urea and hexamethylenetetramine in an aqueous acid solution of a formaldehyde having a pH lower than 3, the proportion of urea to hexamethylenetetramine ranging from approximately 14 to approximately 62 molecules of urea for each molecule of hexamethylenetetramine and the proportion of formaldehyde to urea varying between approximately 1 and approximately 2 molecules of formaldehyde for each molecule of urea and the acid catalyst being added in a proportion less than that required for transforming all the hexamethylenetetramine into its salt.

12. A moldable acid-catalyzed condensation product containing the constituents of urea, formaldehyde and hexamethylenetetramine in chemical combination, the radical of hexamethylenetetramine being present in the condensation molecule in undecomposed state, said product being obtained by condensing urea and hexamethylenetetramine in an aqueous acid solution of a formaldehyde having a pH lower than 3, the proportion of urea to hexamethylenetetramine ranging from approximately 14 to approximately 30 molecules of urea for each molecule of hexamethylenetetramine and the proportion of formaldehyde to urea varying between approximately 1 and approximately 2 molecules of formaldehyde for each molecule of urea and the acid catalyst being added in a proportion less than that required for transforming all the hexamethylenetetramine into its salt.

13. A rapidly hardening molding composition comprising as binder a moldable acid-catalyzed condensation product containing the constituents of urea, formaldehyde and hexamethylenetetramine in chemical combination, the radical of hexamethylenetetramine being present in the condensation molecule in undecomposed state, said product being obtained by condensing urea and hexamethylenetetramine in an aqueous acid solution of a formaldehyde having a pH lower than 3, the proportion of urea to hexamethylenetetramine ranging from approximately 14 to approximately 62 molecules of urea for each molecule of hexamethylenetetramine and the proportion of formaldehyde to urea varying between approximately 1 and approximately 2 molecules of formaldehyde for each molecule of urea and the acid catalyst being added in a proportion less than that required for transforming all the hexamethylenetetramine into its salt.

WILHELM KRAUS.